United States Patent
Schreiber et al.

(10) Patent No.: US 11,529,949 B2
(45) Date of Patent: Dec. 20, 2022

(54) PARKING ASSISTANT AND METHOD FOR ADAPTIVE PARKING OF A VEHICLE TO OPTIMIZE OVERALL SENSING COVERAGE OF A TRAFFIC ENVIRONMENT

(71) Applicants: Hyundai Motor Company, Seoul (KR); Kia Motors Corporation, Seoul (KR)

(72) Inventors: Michael Schreiber, Frankfurt am Main (DE); Lukas Gass, Mainz (DE); Ingmar Langer, Darmstadt (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 197 days.

(21) Appl. No.: 17/069,210

(22) Filed: Oct. 13, 2020

(65) Prior Publication Data
US 2021/0354689 A1 Nov. 18, 2021

(30) Foreign Application Priority Data
May 15, 2020 (DE) .......................... 102020206144.0

(51) Int. Cl.
*B60W 30/06* (2006.01)
*B60W 30/095* (2012.01)
(Continued)

(52) U.S. Cl.
CPC ........ *B60W 30/06* (2013.01); *B60W 30/0956* (2013.01); *B62D 15/0265* (2013.01);
(Continued)

(58) Field of Classification Search
CPC .............. B60W 30/06; B60W 30/0956; B62D 15/0265; B62D 15/0285; G01S 7/003; G01S 7/4039; G01S 13/862; G01S 13/865; G01S 13/87; G01S 13/931; G01S 15/88; G01S 15/931; G01S 17/88; G01S 17/931; G01S 2013/9314; G01S 2013/9316; G01S 2013/9318; G01S 2013/9319; G01S 2013/93271; G01S 2015/932; G08G 1/0125; G08G 1/143; G08G 1/147
See application file for complete search history.

(56) References Cited

U.S. PATENT DOCUMENTS

| 7,994,902 B2 | 8/2011 | Avery et al. |
| 11,181,929 B2 * | 11/2021 | Kelkar .................... H04W 4/08 |
| 2020/0042017 A1 * | 2/2020 | Kelkar ................. G01S 5/0072 |

* cited by examiner

*Primary Examiner* — Peter D Nolan
*Assistant Examiner* — Ce Li Li
(74) *Attorney, Agent, or Firm* — Slater Matsil, LLP

(57) ABSTRACT

A method can be used for adaptive parking of a vehicle. A parking area is determined around a programmed destination of the vehicle. The parking area has more than one available parking spot for the vehicle. Parking data is acquired via a wireless communication network. The parking data for each parked vehicle includes a parking position and an individual sensing coverage of an environment sensor system of the respective parked vehicle scanning the traffic environment within the parking area. Available parking spots are ranked based on a calculated overall sensing coverage and a recommended parking spot is determined among the available parking spots based on overall sensing coverage of the traffic environment in the parking area.

20 Claims, 16 Drawing Sheets

(51) Int. Cl.
    *B62D 15/02*         (2006.01)
    *G01C 21/34*         (2006.01)
    *G08G 1/01*          (2006.01)
    *G08G 1/14*          (2006.01)

(52) U.S. Cl.
    CPC ....... *G01C 21/3461* (2013.01); *G08G 1/0125* (2013.01); *G08G 1/143* (2013.01)

PARKING ASSISTANT AND METHOD FOR ADAPTIVE PARKING OF A VEHICLE TO OPTIMIZE OVERALL SENSING COVERAGE OF A TRAFFIC ENVIRONMENT

CROSS-REFERENCE TO RELATED APPLICATIONS

This application claims priority to German Patent Application No. 102020206144.0, filed on May 15, 2020, which application is hereby incorporated herein by reference.

TECHNICAL FIELD

The present invention relates to a method for adaptive parking of a vehicle to optimize overall sensing coverage of a traffic environment, a parking assistant for adaptive parking of a vehicle, and a vehicle with such a parking assistant.

BACKGROUND

Current vehicles are increasingly connected with sensors and telematics in order to implement advanced driver-assistance systems and/or autonomous driving functionalities. For example, cars may be provided with multiple sensors and various techniques for acquiring data from the environment, e.g. to provide accurate detection of other vehicles, pedestrians, the road ahead and/or behind, the weather and so on. Typical technologies that are utilized for this purpose include radar, laser, LIDAR, infrared, ultrasound, cameras, stereo vision, computer vision, odometry, accelerometers, gyroscopes, GPS, and so on. To produce a more consistent, accurate and useful view of the environment, a variety of such sensors may be provided on a car and the information from these sensors may be combined within an environment sensor system. Data collected with such an environment sensor system may be used to avoid contact between the vehicle and other objects, for example by warning a driver about an approaching object and/or by automatically steering the vehicle accordingly.

Modern cars are increasingly equipped with wireless communication devices, in particular for vehicle-to-everything (V2X) communication, in which information may be communicated from a vehicle to any entity that may affect the vehicle, and vice versa. Such a vehicular communication system may incorporate other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). V2X technology does not only improve traffic flow but also may help to make traffic safer.

For example, U.S. Pat. No. 7,994,902 B2 describes a method and a system for using vehicle-to-vehicle cooperative communications for traffic collision avoidance. One vehicle detects a "situation", such as a pedestrian within the crosswalk, where an "offending object" is in or near a roadway feature, which could result in a collision. The detecting vehicle informs a second vehicle via wireless communications, of the detecting vehicle's GPS location, the GPS location of the detected object, and the GPS location of the roadway feature, i.e., a crosswalk boundary. Additional data about the "offending object" can include its speed and heading. A receiving vehicle receives this data and takes appropriate avoidance action.

However, older cars may not be equipped with such a system. In addition, other road users like cyclists or pedestrians are typically also not connected. Dedicated infrastructure to detect these "invisible" traffic participants may be cost intensive.

SUMMARY

Embodiments of the present invention relate to a method for adaptive parking of a vehicle to optimize overall sensing coverage of a traffic environment, a parking assistant for adaptive parking of a vehicle, and a vehicle with such a parking assistant.

Embodiments provide cost-effective solutions with increased safety for sensing traffic participants.

Embodiments of the present invention provide a method for adaptive parking of a vehicle, a parking assistant for adaptive parking of a vehicle, and a vehicle including a parking assistant.

BRIEF DESCRIPTION OF THE DRAWINGS

The accompanying drawings are included to provide a further understanding of embodiments of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Figure 1:
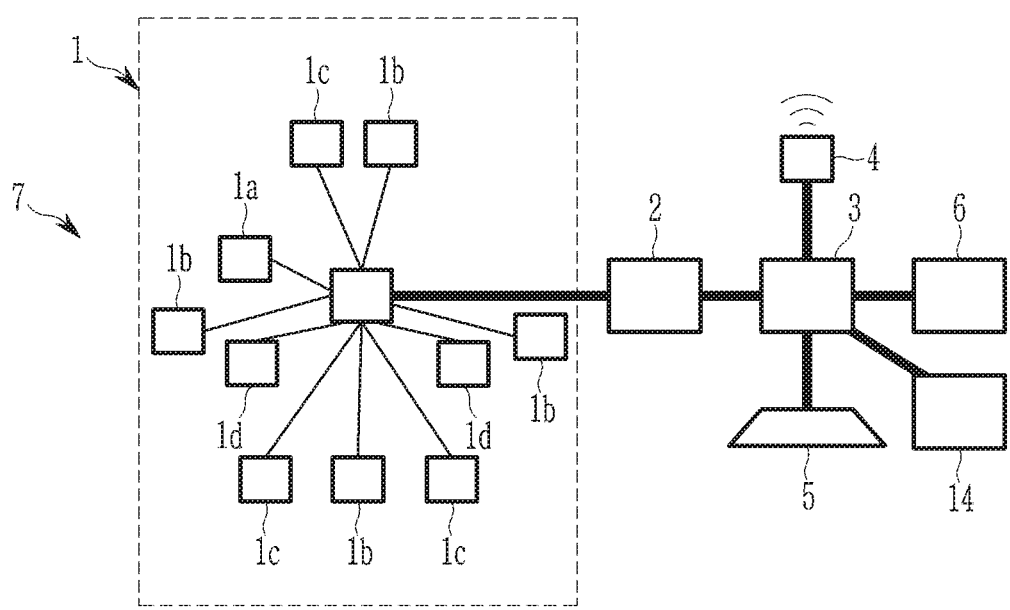
FIG. 1 schematically depicts a parking assistant according to an embodiment of the invention.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

The following list of reference numbers can be used in conjunction with the drawings:

1 environment sensor system
1*a*, 1*b* camera
1*c* radar
1*d* ultrasonic sensor
1*e* sensor control
2 determination unit
3 decision unit
4 communication unit 5 driver interface
6 assisted/autonomous driving unit
7 parking assistant
8 individual sensing coverage
9 parking spot
10 vehicle
11 parked vehicle
12 parking area
13 further vehicle
14 communication link
15 navigation system
RA traffic relevant area
M method
M1-M6 method steps

DETAILED DESCRIPTION OF ILLUSTRATIVE EMBODIMENTS

According to one embodiment of the invention, a method for adaptive parking of a vehicle to optimize overall sensing coverage of a traffic environment comprises determining a parking area around a programmed destination of the vehicle, the parking area having several available parking spots for the vehicle, acquiring parking data of parked vehicles in the parking area via a wireless communication network, wherein the parking data for each parked vehicle comprises a parking position of the respective parked vehicle and an individual sensing coverage of an environment sensor system of the respective parked vehicle scanning the traffic environment within the parking area, calculating for each available parking spot in the parking area the overall sensing coverage for scanning the traffic environment within the parking area for the case of parking the vehicle in the respective available parking spot, based on an individual sensing coverage for scanning the traffic environment within the parking area from the respective parking spot with an environment sensor system of the vehicle and the individual sensing coverages of the parked vehicles, ranking the available parking spots based on the calculated overall sensing coverage, and determining a recommended parking spot among the available parking spots with optimized overall sensing coverage of the traffic environment in the parking area.

According to another embodiment of the invention, a parking assistant for adaptive parking of a vehicle to optimize overall sensing coverage of a traffic environment comprises an environment sensor system configured to scan a traffic environment around the vehicle, a navigation system configured to determine a parking area around a programmed destination of the vehicle, the parking area having several available parking spots for the vehicle, a communication unit configured to acquire parking data of parked vehicles in the parking area via a wireless communication network, wherein the parking data for each parked vehicle comprises a parking position of the respective parked vehicle and an individual sensing coverage of an environment sensor system of the respective parked vehicle scanning the traffic environment within the parking area, and a determination unit configured to calculate for each available parking spot in the parking area the overall sensing coverage for scanning the traffic environment within the parking area for the case of parking the vehicle in the respective available parking spot, based on an individual sensing coverage for scanning the traffic environment within the parking area from the respective parking spot with an environment sensor system of the vehicle and the individual sensing coverages of the parked vehicles, configured to rank the available parking spots based on the calculated overall sensing coverage and configured to determine a recommended parking spot among the available parking spots with optimized overall sensing coverage of the traffic environment in the parking area.

According to yet another embodiment of the invention, a vehicle, in particular a motor vehicle, comprises a parking assistant according to embodiments of the invention.

One embodiment of the present invention parks vehicles that are equipped with an environment sensor system and connected to a wireless communication system in an optimized way in order to increase sensor visibility. In that way, the sensors of these vehicles may, for example, be utilized more effectively to support the detection of unconnected traffic participants and thus improve visibility of the same. This optimized positioning of parked vehicles thus offers the possibility for improved scanning of relevant areas, e.g. in a city, which in turn may help to increase overall performance of the traffic.

The herein described adaptive positioning (or relocation) of parked vehicles allows optimized scanning of the traffic environment to support active traffic participants (e.g. moving vehicles). The scanning data of parked vehicles is processed and may be sent via a wireless communication network to surrounding vehicles. This is especially helpful for vehicles that due to their position have no or only limited ability to gather information with their onboard sensors in specific areas. The positioning of the vehicles may be done by a suggestion of the vehicle (e.g. in the infotainment system or the instrument cluster) to the driver for non-automated cars. In case of autonomous driving, the vehicles may perform the positioning or the relocation automatically. A vehicle may be parked in the parking spot that offers the best sensing coverage and thus the best available sensor visibility.

The parking data for each parked vehicle comprises a parking position and an individual sensing coverage of the environment sensor system of the respective parked vehicle. The parking position may not only include information about the location of the vehicle and/or its current parking spot (e.g. GPS coordinates), but also information about the actual orientation of the respective vehicle at that location. The orientation of the vehicle may affect the sensing coverage of the vehicle. For example, the sensors in the front of a vehicle may be more precise and/or effective than sensors in the rear or at the sides and/or may have a different sensing range.

The steps of calculating the overall sensing coverage, ranking the available parking spots and/or determining the recommended parking spot may for example be conducted by a processing unit installed on the vehicle looking for a parking spot around the programmed destination. Alternatively or additionally, some or all of the above steps may also be executed by a processing unit, which is installed somewhere within the environment and/or is connected to the vehicle via the wireless communication network, e.g. a computing unit, which may be stationary or mobile, e.g. within a building or on board another vehicle.

It is understood that the term "vehicle" or "vehicular" or other similar term as used herein is inclusive of motor vehicles in general such as passenger automobiles including sports utility vehicles (SUVs), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Advantageous embodiments and improvements of the present invention are found in the claims.

According to an embodiment of the invention, the overall sensing coverage may be calculated for different parking orientations in each available parking spot. The recommended parking spot may include a recommended parking orientation. Accordingly, the determination unit may be configured to calculate the overall sensing coverage for different parking orientations in each available parking spot.

In this embodiment, the system takes into account the orientation of the vehicle and thus of the sensor system. For example, the vehicle may be parked in a parking bay with its front pointing to a wall or building or other obstruction. A radar sensor in the front of the vehicle thus would only have severely limited visibility and would thus barely be able to provide any helpful sensing coverage of the traffic environment. However, when the vehicle is parked with its back to the obstructive wall or building, the front radar would basically be able to scan the traffic environment without any hindrance.

According to an embodiment of the invention, the recommended parking spot may be determined when the vehicle is at a given arrival distance and/or arrival time from the programmed destination.

Hence, the vehicle may contact the parked vehicles and request information on the parking situation and the corresponding sensing information some time or distance before arrival (e.g. 3-5 min or 1 km). Alternatively or additionally, the vehicle may start assessing the situation and acquiring information on the parking situation when the parking assistant, that is, the automatic parking system, is activated. The automatic parking system may thus be used as a trigger, when no information about the destination is available. Care should be taken however that the vehicle does not ask about the parking situation too early, otherwise the situation may have changed already when the car arrives. However, the vehicle may constantly update its parking strategy and thus reevaluate the recommended parking spot until it has arrived at one preferred spot.

According to an embodiment of the invention, the recommended parking spot may be determined by a calculation unit being in wireless data communication with a communication unit of the vehicle.

The optimal parking position, as well as potentially the vehicle orientation, may thus be calculated and communicated by an external decision maker (e.g. a cloud computer) in wireless communication with a parking assistant of the vehicle. In that case the vehicle may merely receive a recommendation for a parking spot. In case of autonomous driving, the vehicle may also receive information on a recommended parking spot, and may subsequently drive to that spot by itself, that is, without intervention of the driver.

According to an embodiment of the invention, the recommended parking spot may be determined by a parking assistant of the vehicle.

In an alternative embodiment, the vehicle may thus assess the parking situation and determine an optimal parking spot on its own. As soon as a recommended parking spot is determined, the vehicle may inform the driver to steer the vehicle to that spot.

According to an embodiment of the invention, the method may further comprise autonomously steering, by an assisted/autonomous driving unit of the vehicle, the vehicle into the recommended parking spot.

Thus, the vehicle may not only receive and/or determine the recommended parking spot. In addition, the vehicle may automatically drive to the respective spot and/or automatically park there, e.g. in an optimal orientation. The driver may be present during the whole parking maneuver in order to be able to supervise the maneuver and may take action if necessary. However, it may also be possible that the driver leaves the vehicle at the parking spot or close to the parking spot before the vehicle then proceeds and parks the vehicle autonomously in the recommended parking spot, e.g. in an optimal orientation.

According to an embodiment of the invention, determining the recommended parking spot may take into account prognostic driving data of the parked vehicles and further vehicles. The prognostic driving data may comprise information about vehicles arranging to leave and/or arrive at parking spots of the parking area. Accordingly, the determination unit may be configured to determine the recommended parking spot taking into account the prognostic driving data of the parked vehicles and further vehicles.

For example, the parking position and the car orientation may be calculated and communicated by an external and centralized calculating device (e.g. ground based). In that case, the method may take additional factors into account like, for example, when a vehicle is going to leave the parking area and/or a parking slot, when other vehicles will arrive, what kind of sensors these vehicles are equipped with, and so on.

However, also in the event the parking assistant of the vehicle assesses the situation, it may contact other vehicles and/or other entities via the wireless communication network in order to acquire these and further data.

In all these cases however, sensor visibility is expected to be improved even further in the parking area by employing the prognostic data.

According to an embodiment of the invention, the parking area may be divided into subareas of different relevance levels. The available parking spots may be ranked according to a weight based on the relevance level of the respective subarea, in which the respective available parking spot is situated.

Hence, the method and system may be further improved by weighting subareas as more or less important (e.g. a road may be considered to be more important than pavement, a parking lot, a building, and so on). Additional optimization would be possible, for example, by defining areas that are more dangerous (likelihood that an accident occurs and/or having a higher criticality, e.g. in front of schools) and taking this information into account.

According to an embodiment of the invention, a sensor quality may be assigned to the environment sensor system of each vehicle. The available parking spots may be ranked taking into account the sensor quality of the environment sensor system of the vehicle.

Hence, the method and system may be additionally improved if the quality of the sensor of each vehicle in the fleet is known. In that case, the vehicle with the best sensors may be placed in the more critical and more demanding location with respect to sensor performance. Sensor quality within the meaning of embodiments of the present invention may relate, for example, to sensor precision, range and/or performance/effectivity. Moreover, mounting position and orientation of the sensors at the respective vehicle may affect the sensor quality.

The invention will be explained in greater detail with reference to exemplary embodiments depicted in the drawings as appended.

Figure 2:
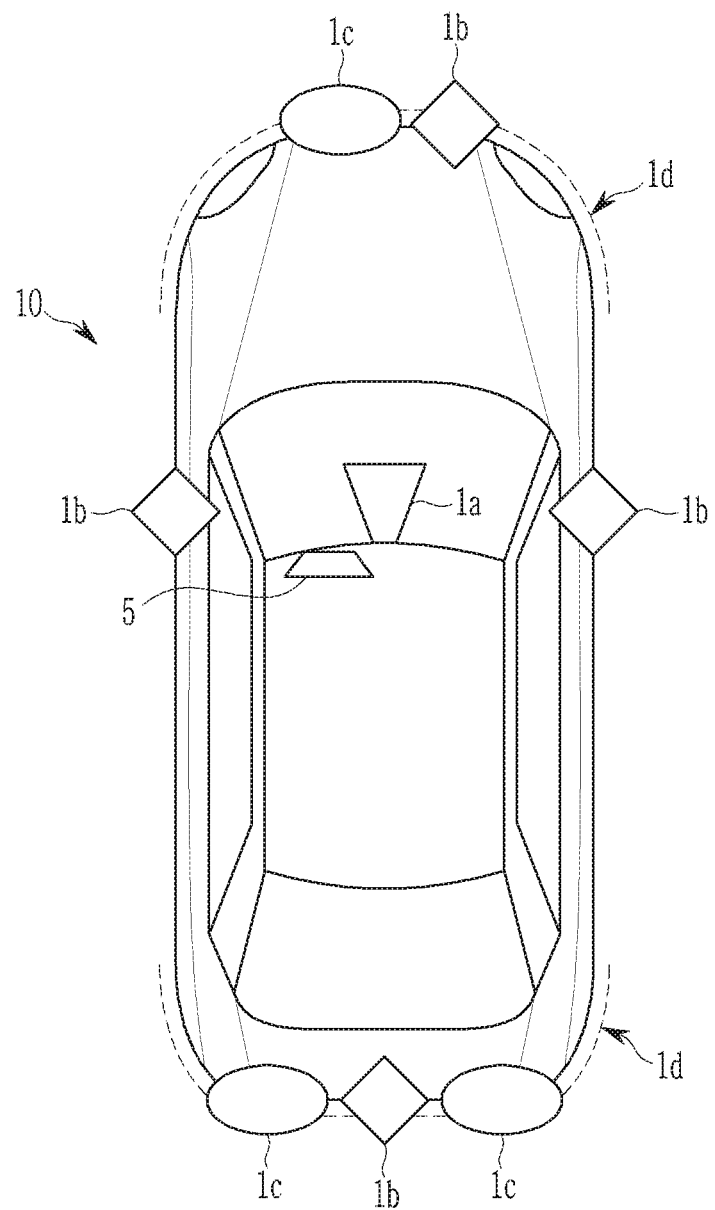
FIG. 2 schematically shows a motor vehicle comprising the parking assistant of FIG. 1.
Figure 3:
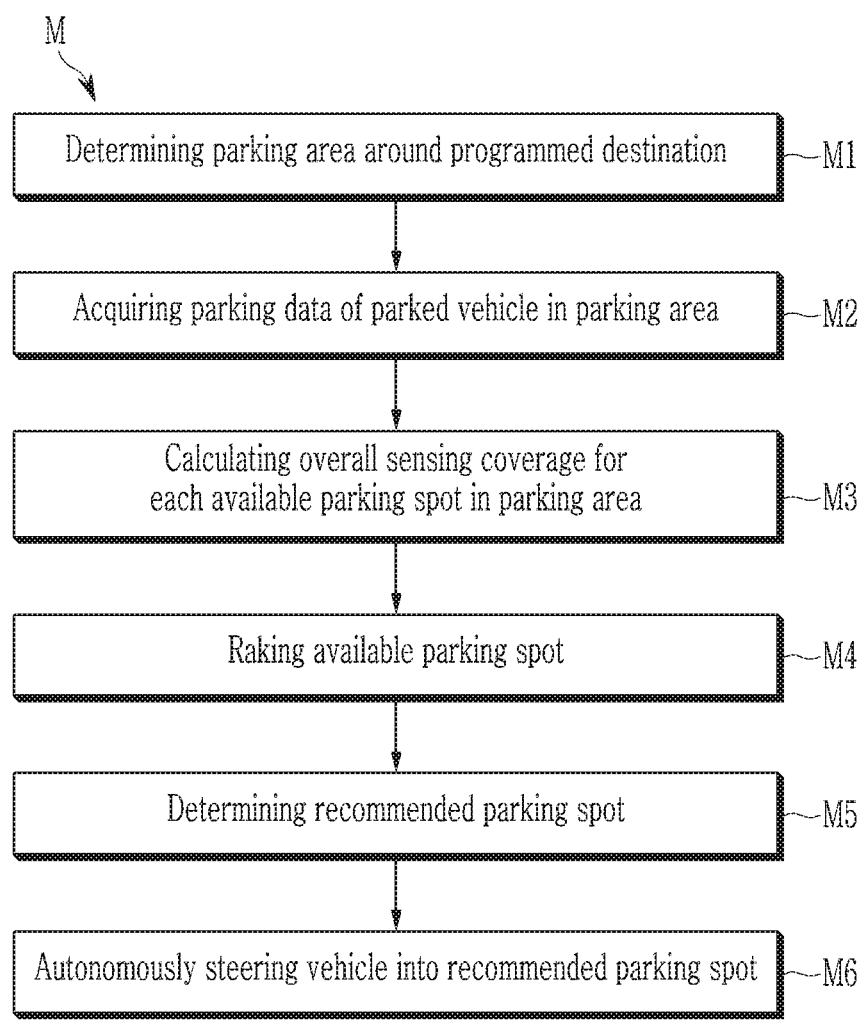
FIG. 3 shows a flow diagram of a method for adaptive parking of a vehicle with the parking assistant of FIG. 1.

FIG. 1 schematically depicts a parking assistant 7 according to an embodiment of the invention. FIG. 2 shows a vehicle 10 comprising the parking assistant 7 of FIG. 1. The parking assistant performs adaptive parking of the vehicle 10 in order to optimize overall sensing coverage of a traffic environment, as will be explained further below. FIG. 3 shows a flow diagram of a method M for adaptive parking of the vehicle 10 of FIG. 2 using the parking assistant 7 of FIG. 1.

The parking assistant 7 of the vehicle 10, e.g., a car, comprises an environment sensor system 1, which is configured to scan a traffic environment around the vehicle 10. To this end, the environment sensor system 1 comprises a variety of different sensor technologies as they are utilized in modern vehicles, in particular in assisted and/or autonomous driving systems, e.g., sensors to sense other vehicles, pedestrians, bicycles and other traffic participants and/or objects. The exemplary sensor system 1 shown in FIGS. 1 and 2 comprises a front camera 1a and a 360°-view camera system comprising several individual cameras 1b arranged at several positions over the vehicle 10. The sensor system 1 further comprises several radars 1c, e.g. short-range and/or long-range radars, as well as ultrasonic sensors 1d. However, the person of skill may provide the vehicle 10 with other sensors depending on the particular application at hand. Furthermore, different sensor technologies and arrangements may be employed, e.g. lidars, laser scanners, etc.

Figure 4:
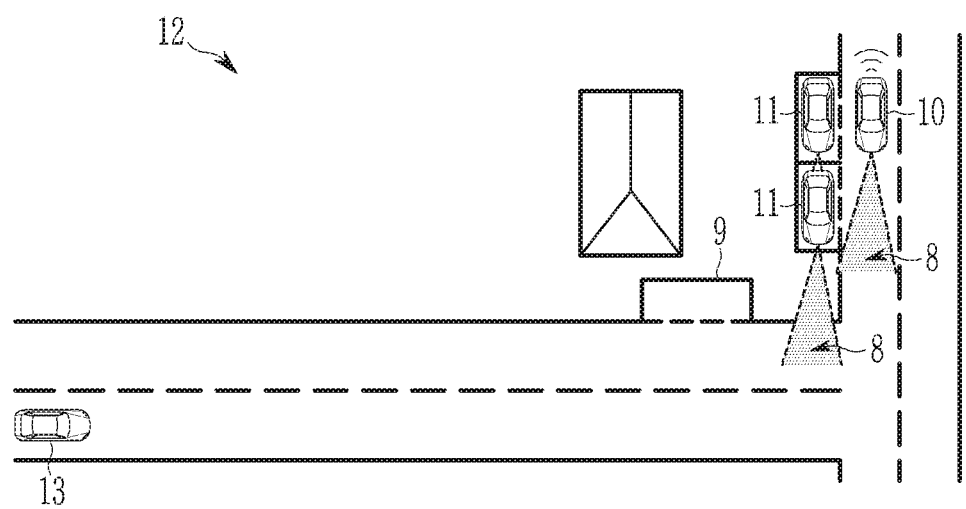
FIG. 4 schematically depicts usage of the parking assistant of FIG. 1 within an exemplary parking area.
Figure 5:
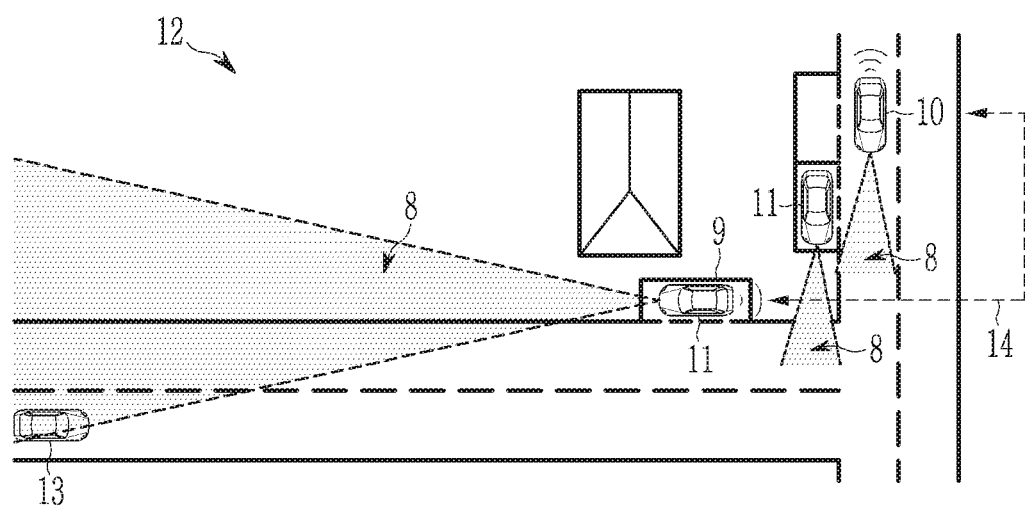
FIG. 5 schematically depicts the example of FIG. 4 in a different configuration.

Depending on the specific environment as well as the position and orientation of the vehicle 10, the environment sensor system 1 will have a certain individual sensing coverage 8 in an area around the vehicle 10. FIGS. 4 and 5 schematically depict usage of the parking assistant 7 of FIG. 1 within an exemplary parking area 12. As can be seen on the right sight of FIG. 4, the environment sensor system 1 of this particular example provides individual sensing coverage 8 in a conical area in front of the driving vehicle 10. Various parked vehicles 11 in FIG. 4 also provide a respective individual sensing coverage 8 in their front direction, which however may be blocked by a vehicle and/or a building obstructing the respective sensor.

The parking assistant 7 further comprises a decision unit 3, e.g. a microprocessor and/or computer system integrated in the vehicle 10, which is connected to various subsystems of the vehicle 10 comprising a determination unit 2, a communication unit 4, a driver interface 5, an assisted/autonomous driving unit 6 and a navigation system 15. The determination unit can be implemented as a processor (e.g., coupled to a memory storing software) or a controller.

The determination unit 2 is coupled with the environment sensor system 1 and configured to analyze information recorded by the environment sensor system 1. The various sensors 1a-1d are communicatively connected (e.g. in parallel) to a sensor control 1e of the sensor system 1, which in turn is communicatively connected with the determination unit 2 and the further components. The depicted connections are to be understood in a purely schematic way.

The analyzed information can then be transferred to the decision unit 3 for further processing and analysis. For example, the decision unit 3 may provide the respective data to the assisted/autonomous driving unit 6, which may then either steer the vehicle 10 automatically based on these data and/or may inform a driver via the driver interface 5 about certain driving recommendations and/or advice.

The communication unit 4 is configured to connect the vehicle 10 to a wireless communication network, e.g. for V2X communication. The vehicle 10 may contact the other parked vehicles 11 and/or further vehicles 13 (e.g. the one driving on the left side of FIG. 4) via the communication unit 4, as long as these vehicles 11, 13 are also equipped with corresponding communication hardware. A thus established communication link 14 may for example be used to share sensor data of their respective environment sensor systems 1.

In the example of FIG. 4, a vehicle 10 may approach an intersection from an upper side (upper right in FIG. 4) and may not be able to detect the further vehicle 13 approaching from the left with its own sensors (cf. individual sensing coverage 8). The further vehicle 13 may be a moving traffic participant that is not equipped with a wireless transmitting device (no V2X). However, the two parked vehicles 11 may be equipped with respective communication equipment such that their respective sensor data could be used by the moving vehicle 10 to get further information on the vehicle 13 approaching from the left.

However, the parked vehicles 11 are oriented downwards and thus they cannot provide support with their sensors, because they point in the wrong direction (cf. individual sensing coverage 8). Moreover, the lower of the two parked vehicles 11 blocks the field of view of the upper one. If the upper parked vehicle 11 however would move from the current position behind the lower parked vehicle 11 to a position around the corner, as shown in FIG. 5, the vehicle 10 approaching from the top may detect the further vehicle 13 coming from the left by receiving the sensor data of the parked vehicle 11 via the communication link 14.

This insight is used in embodiments of the present invention to provide an adaptive parking assistant 7 that determines a recommended parking spot in order to achieve an optimized and increased sensor visibility and thus sensing coverage of a traffic environment, as will be explained below.

Figure 6:
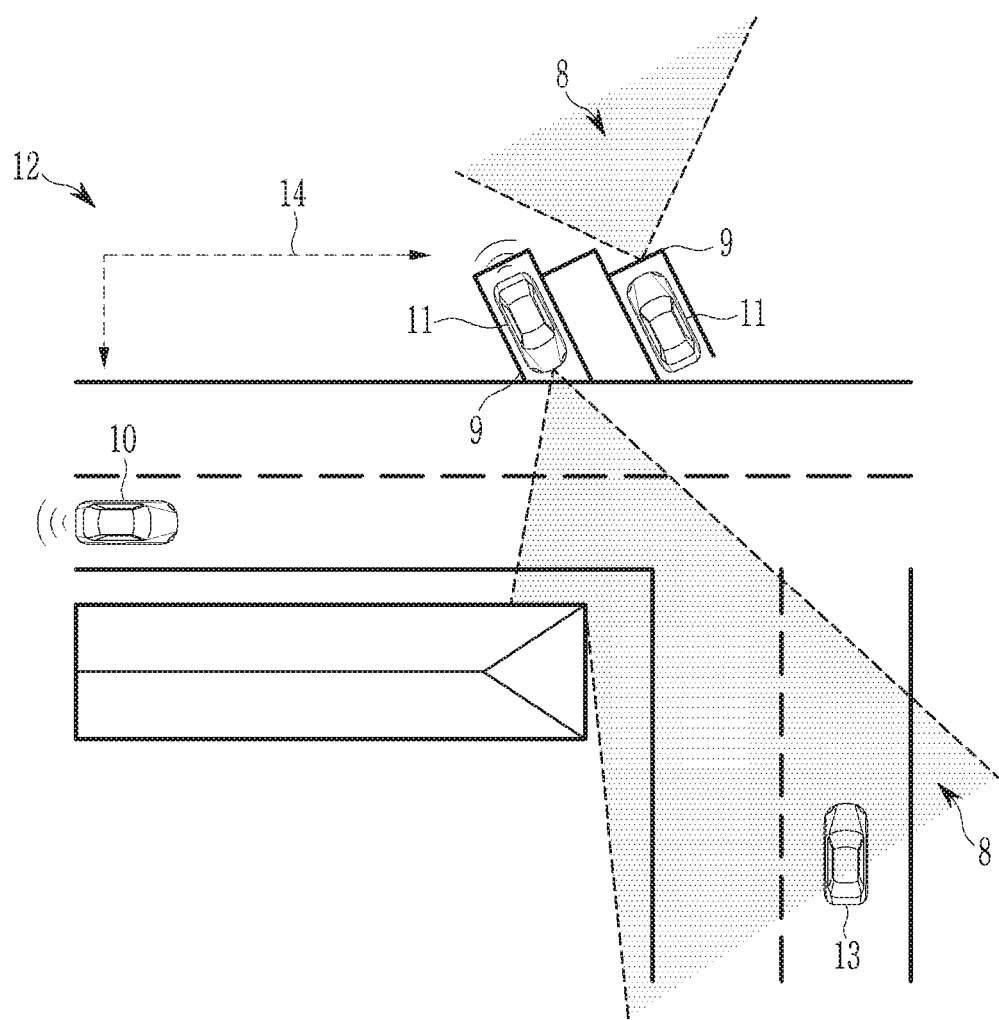
FIG. 6 schematically depicts usage of the parking assistant of FIG. 1 within another exemplary parking area.
Figure 7:
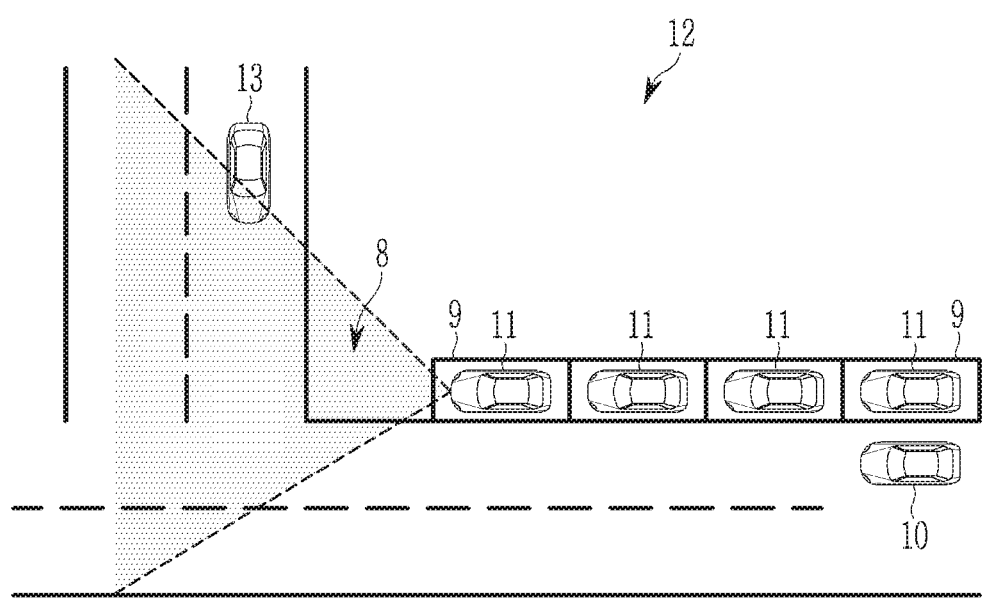
FIG. 7 schematically depicts usage of the parking assistant of FIG. 1 within yet another exemplary parking area.

FIGS. 6 and 7 show two further examples. In FIG. 6, the parked vehicle 11 on the right is oriented towards the top and thus the conical individual sensing coverage 8 points away from the further vehicle 13 approaching the crossing from below (lower right in FIG. 6). However, the parked vehicle 11 on the left is oriented in the opposite direction such that the further vehicle 13 is entering the individual sensing coverage 8 of this parked vehicle 11. The further vehicle 13 can thus be detected by the parked vehicle 11, which may share its sensing data with the vehicle 10 coming from the left via a respective wireless communication link 14.

In a similar vein, the vehicle 10 approaching from the right in FIG. 7 may contact the parked vehicle 11 in the front in order to assess its sensor data to be able to detect the further vehicle 13 driving downwards. In this example, the parking spot 9 on the outer left should thus be occupied by a vehicle 11 that is equipped with corresponding wireless communication equipment. The other parking spots 9 to the right may not be as important such that vehicles 11 without the necessary equipment may preferably be parked there.

Embodiments of the present invention now organize the parking process of a vehicle 10 equipped with wireless communication equipment, e.g. the one in FIG. 3, in order to optimize overall sensing coverage of a traffic environment.

To this end, the navigation system 15 of the parking assistant 7 of FIG. 1 is configured to determine a parking area 12 around a programmed destination of the vehicle 10, the parking area 12 having several available parking spots 9 for the vehicle 10. To this end, the navigation system 15 may acquire a high-definition map of the environment around the destination. For example, FIG. 7 shows an exemplary parking area 12, in which the programmed destination of the vehicle 10 may be located. As can be seen, the parking area 12 comprises six parking spots 9 overall, in which the vehicle 10 in principle may be parked.

Referring again to FIG. 1, the communication unit 4 of the parking assistant 7 of FIG. 1 is configured to acquire parking data of parked vehicles 11 in the parking area 12 via a wireless communication network, e.g. via V2X communication between these vehicles. The parking data for each parked vehicle 11 includes a parking position and a parking orientation of the respective parked vehicle 11 as well as an individual sensing coverage 8 of an environment sensor system of the respective parked vehicle 11 scanning the traffic environment within the parking area 12.

Figure 8:
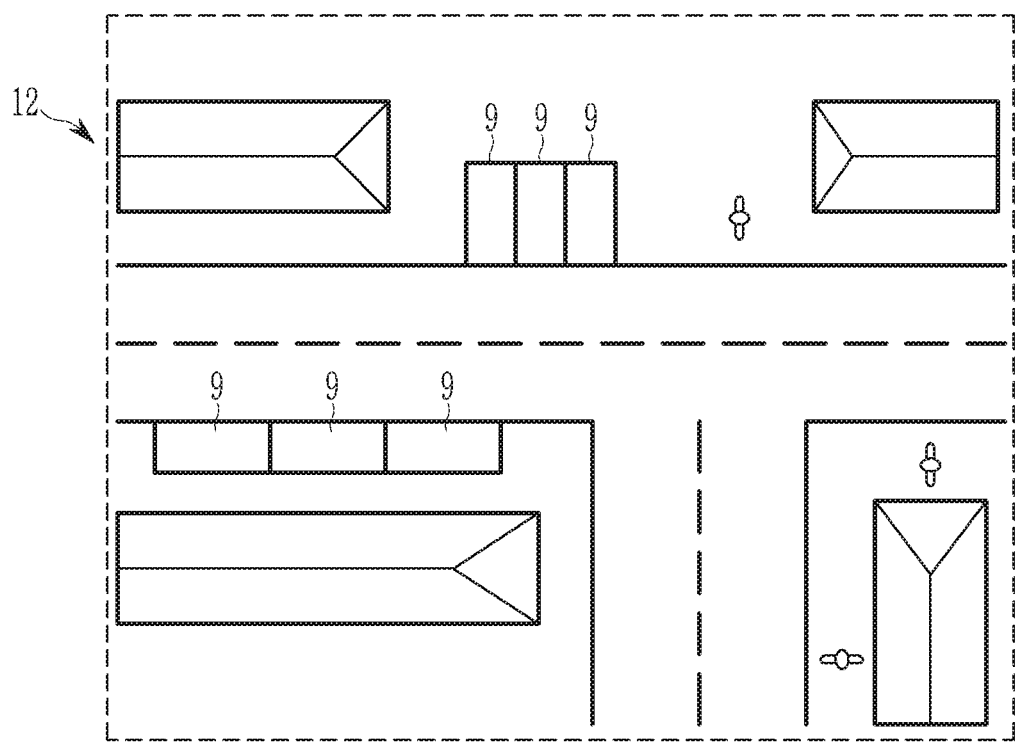
FIGS. 8 to 16 schematically depict detailed steps of the method of FIG. 3 for a further exemplary parking area.
Figure 9:
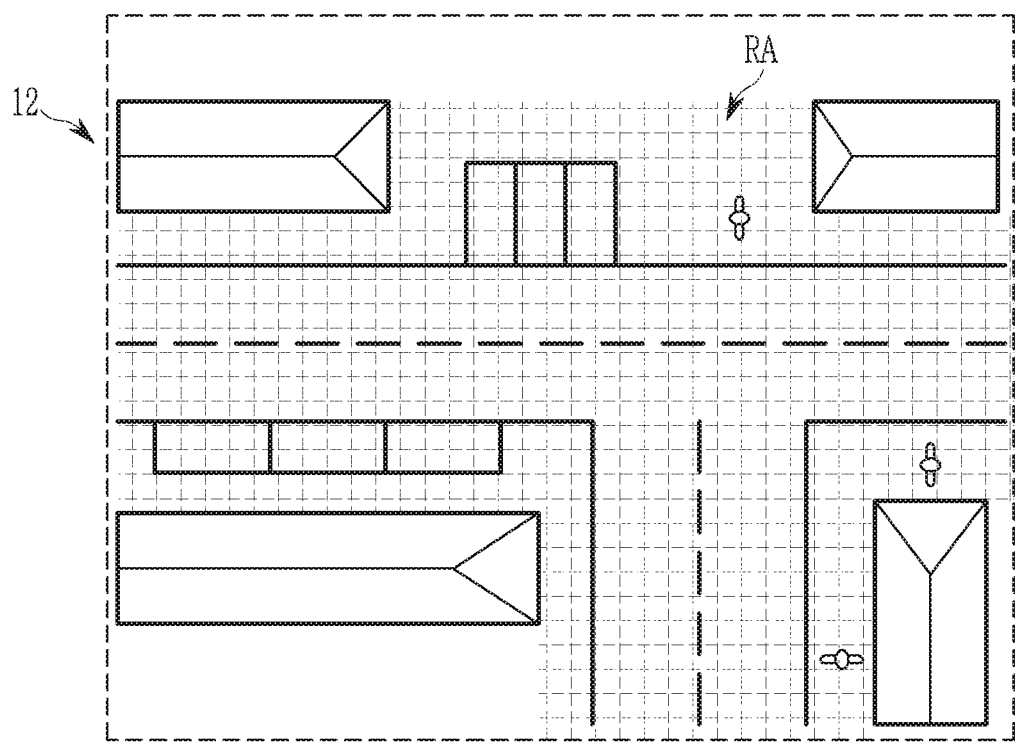
Figure 10:
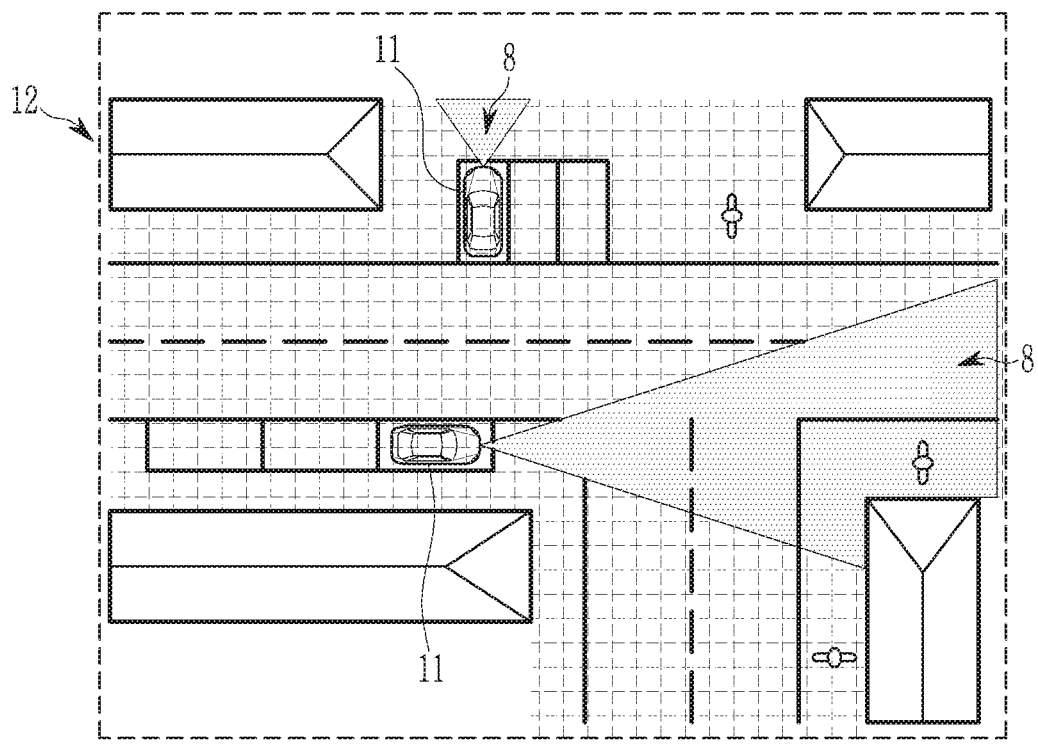

An illustration of this can be found in FIGS. 9 and 10. FIG. 9 principally shows the situation of FIG. 8. However, now a traffic relevant area RA is selected in the parking area 12 (cf. grid in FIG. 9). FIG. 10 shows an example with two parked vehicles 11 and their respective individual sensing coverage 8.

Referring again to FIG. 1, the determination unit 2 of the parking assistant 7 is configured to calculate for each available parking spot 9 in the parking area 12 the overall sensing coverage for scanning the traffic environment within the parking area 12 for the case of parking the vehicle 10 in the respective available parking spot 9. Here, the overall sensing coverage is the combination of an individual sensing coverage 8 for scanning the traffic environment within the parking area 12 from the respective parking spot 9 with an environment sensor system 1 of the vehicle 10 and the individual sensing coverages 8 of the parked vehicles 11.

This procedure may be started when the vehicle 10 enters the parking area 12 or even before when the vehicle 10 is still at a given arrival distance and/or arrival time from the programmed destination. Next the parking assistant 7 evaluates the overall sensing coverage for each possible parking spot 9 and orientation.

FIGS. 11 to 16 demonstrate six possible parking solutions for the vehicle 10 when starting from the scenario of FIG. 10.

Figure 11:
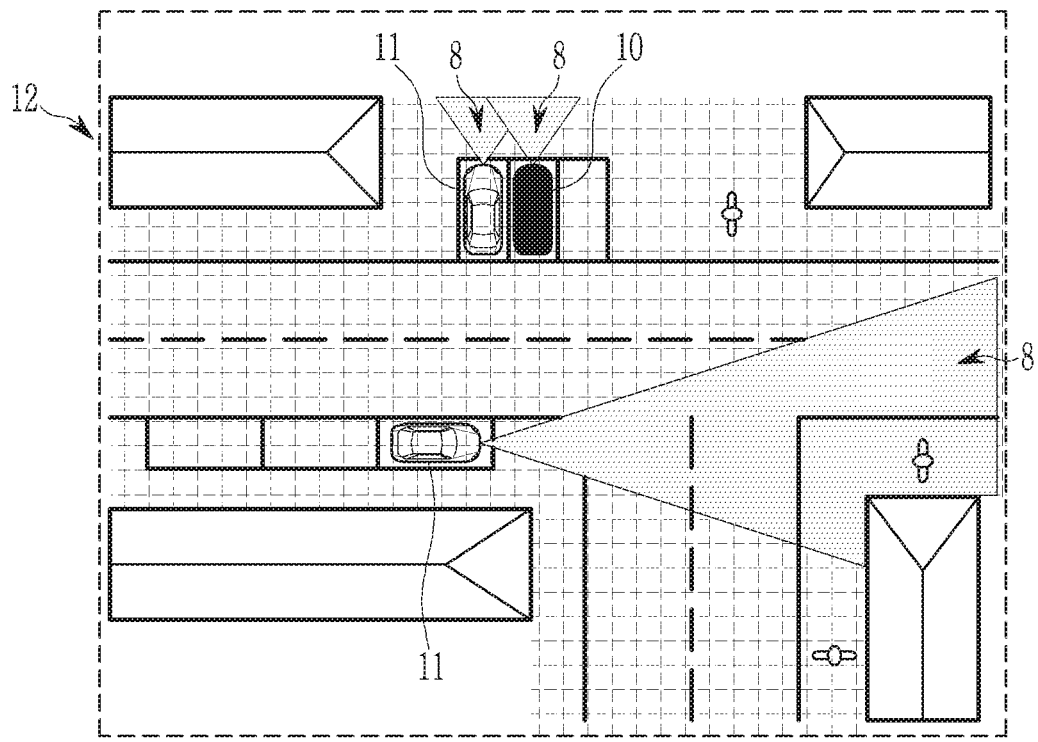
Figure 12:
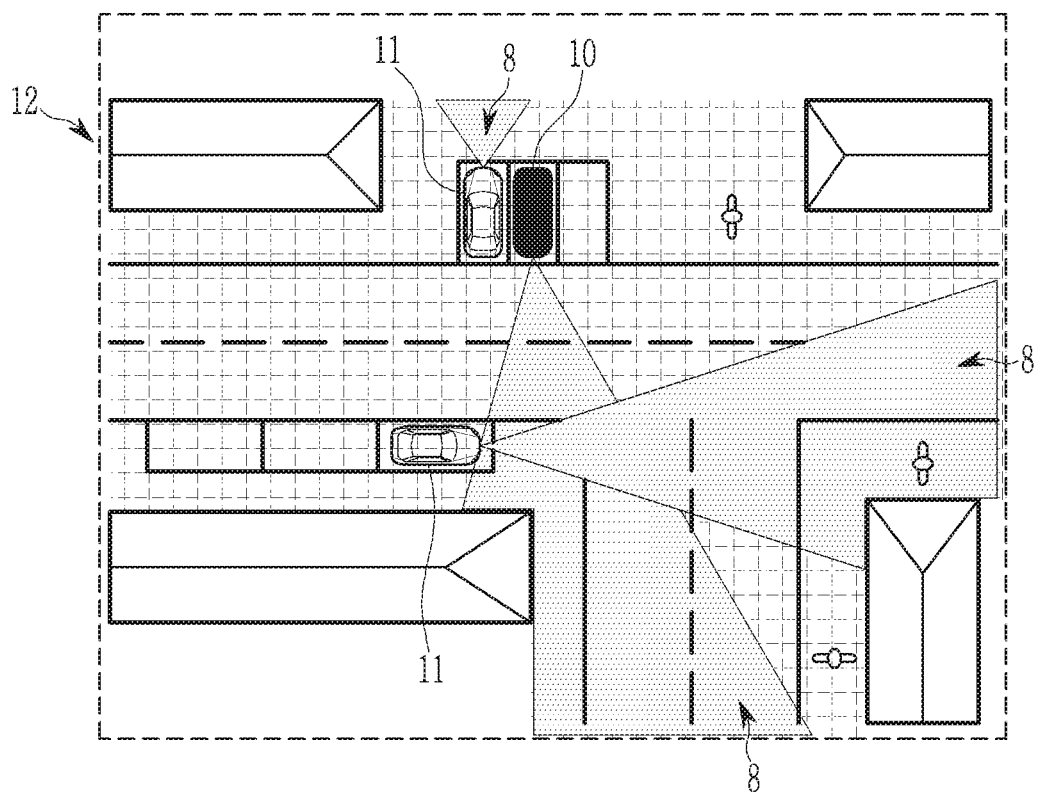

In FIGS. 11 and 12, the vehicle 10 would take the upper middle parking spot 9, which is a parking bay and may thus allow parking in two orientations, i.e. perpendicular to the road either with the front away from the road (FIG. 11) or towards the road (FIG. 12).

A coverage ratio CR corresponding to a relative overall sensing coverage may be calculated on the basis of the traffic relevant area RA and the individual sensing coverages $S_i$ of the respective parking spots 9 as follows:

$$CR = (\Sigma S_i - \Sigma S_i \cap S_j)/RA$$

with i=1, ..., n and j=1, ..., n with i≠j and n being the number of parked vehicles (overlapping areas are thus removed).

The example of FIG. 11 may result in a CR of 16%, for example, while the example of FIG. 12 may give a somewhat higher CR of 35% (due to the fact that the individual sensing coverage 8 of the vehicle 10 covers a much larger part of the traffic relevant area RA in case the vehicle 10 is oriented towards the road).

Figure 13:
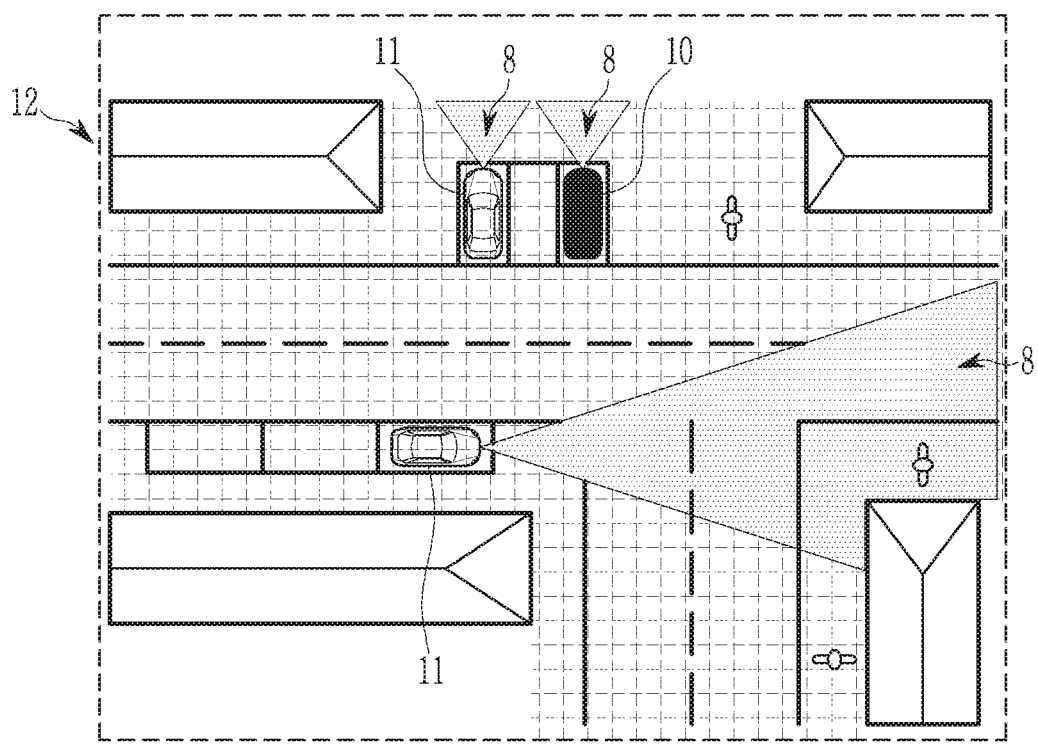
Figure 14:
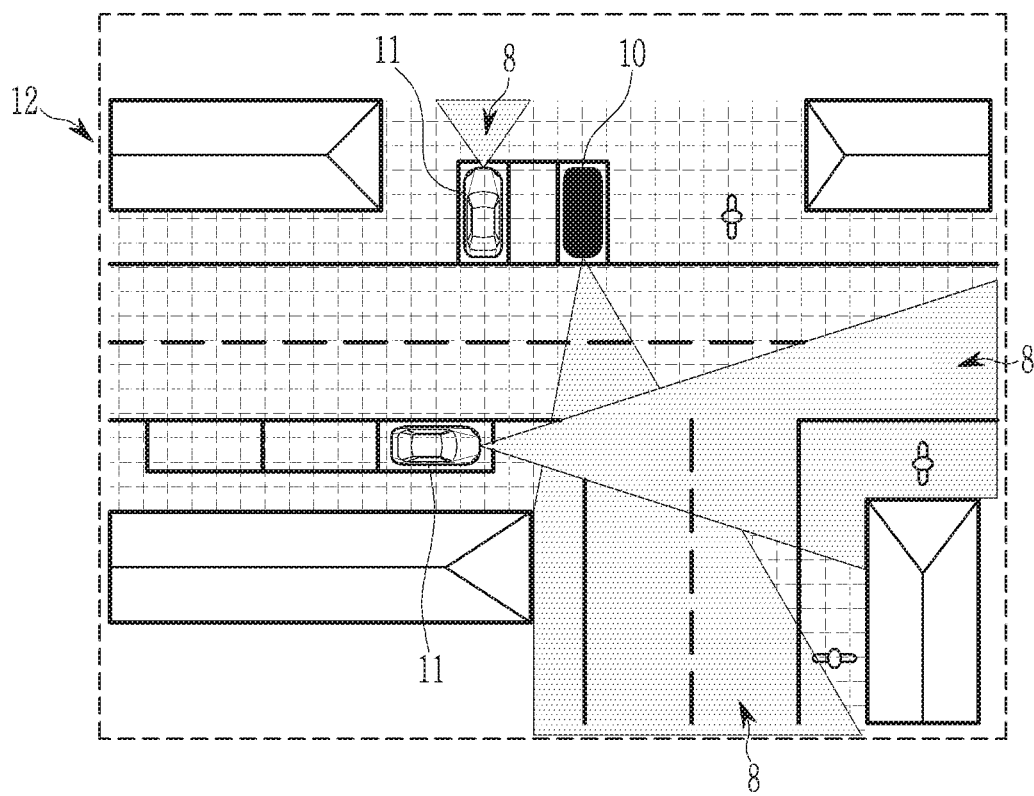

In FIGS. 13 and 14, the vehicle 10 takes respective parking positions within the upper right parking spot 9. These may result in a CR of 17% in the case of FIG. 13 (slightly larger than in the case of FIG. 11 due to the missing overlap) and 40% in the case of FIG. 14 (again larger than in the case of FIG. 12 due to the fact that the lower parked vehicle 11 blocks the field of view of the vehicle 10 in FIG. 12).

Figure 15:
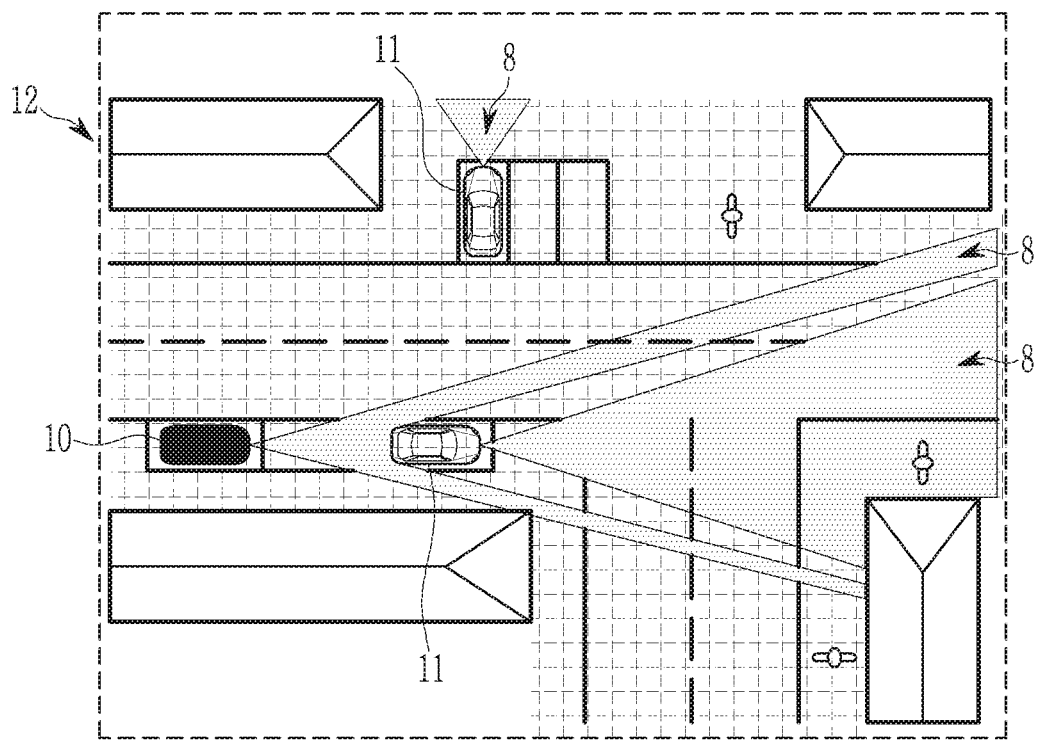
Figure 16:
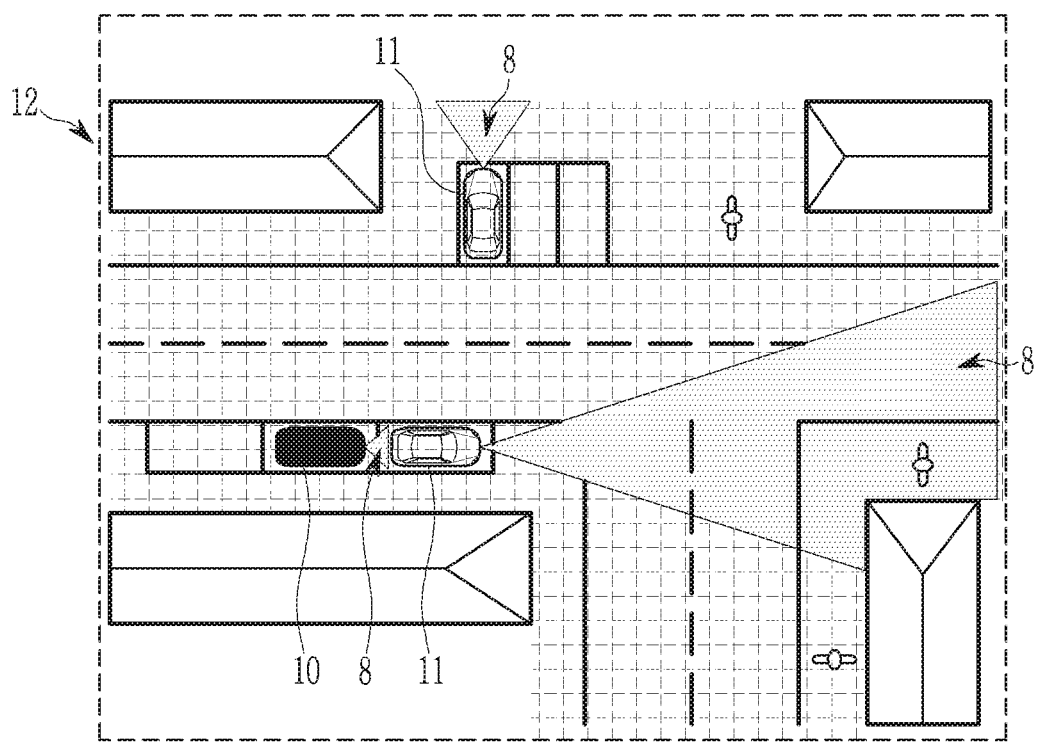

Finally, in FIGS. 15 and 16, the vehicle 10 parks in the parallel parking bays on the left of the figure (which in this example may only be occupied being oriented in the driving direction, that is, oriented to the right). Here, a CR may result in 23% in the case of FIG. 15 and in 15.5% in the case of FIG. 16.

The determination unit 2 is further configured to rank the available parking spots 9 based on the calculated overall sensing coverage (i.e. in this case the corresponding coverage ratio) and to determine a recommended parking spot 9 among the available parking spots 9 with optimized overall sensing coverage of the traffic environment in the parking area 12.

In the example of FIGS. 11 to 16, the parking spot of FIG. 14 gives the highest coverage ratio and thus this parking spot is ranked highest and thus may be chosen as recommended parking spot 9. Based on this result, the decision unit 3 may command the assisted/autonomous driving unit 6 to steer the vehicle 10 into the recommended parking spot of FIG. 14. Alternatively, the parking assistant 7 may also merely provide a corresponding recommendation to the driver over the driver interface 5 to park in the recommended parking spot 9.

Even though the recommended parking spot 9 is determined in the described example by the parking assistant 7 of the vehicle 10, it is to be understood that in other embodiments of the invention, the recommended parking spot 9 may be determined by an external calculation unit and provided to the vehicle 10 over a wireless data connection via the communication unit 4.

The corresponding method M of FIG. 3 thus comprises under M1 determining the parking area 12 around the programmed destination of the vehicle 10, under M2 acquiring the parking data of the parked vehicles 11 in the parking area 12 via the wireless communication network, under M3 calculating for each available parking spot 9 in the parking area 12 the overall sensing coverage, under M4 ranking the available parking spots 9 based on the calculated overall sensing coverage, under M5 determining the recommended parking spot 9 among the available parking spots 9 with optimized overall sensing coverage of the traffic environment in the parking area 12, and optionally under M6 autonomously steering the vehicle 10 into the recommended parking spot 9.

In sum, the parking assistant 7 thus offers a cost-effective solution with increased safety for sensing traffic participants, in which vehicles with wireless connection and sensing equipment are parked strategically in an optimized way in order to be able to make best use of the sensors.

In the foregoing detailed description, various features are grouped together in one or more examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described in order to explain the principles of the invention and its practical applications, to thereby enable others skilled in the art to utilize the invention and various embodiments with various modifications as are suited to the particular use contemplated.

What is claimed is:

1. A method for adaptive parking of a vehicle, the method comprising:
   determining a parking area around a programmed destination of the vehicle, the parking area having more than one available parking spot for the vehicle;
   acquiring parking data of parked vehicles in the parking area via a wireless communication network, wherein the parking data for each parked vehicle comprises a parking position of the respective parked vehicle and an individual sensing coverage of an environment sensor system of the respective parked vehicle scanning the traffic environment within the parking area;
   calculating for each available parking spot in the parking area an overall sensing coverage for scanning the traffic environment within the parking area for the case of parking the vehicle in the respective available parking spot, based on an individual sensing coverage for scanning the traffic environment within the parking area from the respective parking spot with an environment sensor system of the vehicle and the individual sensing coverages of the parked vehicles;
   ranking the available parking spots based on the calculated overall sensing coverage;
   determining a recommended parking spot among the available parking spots based on overall sensing coverage of the traffic environment in the parking area; and
   autonomously steering, by an assisted/autonomous driving unit of the vehicle, the vehicle into the recommended parking spot.

2. The method according to claim 1, wherein the overall sensing coverage is calculated for different parking orientations in each available parking spot, wherein the recommended parking spot includes a recommended parking orientation.

3. The method according to claim 2, wherein determining the recommended parking spot is performed when the vehicle is at a given arrival distance or arrival time from the programmed destination.

4. The method according to claim 2, wherein the recommended parking spot is determined by a calculation unit in wireless data communication with a communication unit of the vehicle.

5. The method according to claim 2, wherein determining the recommended parking spot takes into account prognostic driving data of the parked vehicles and further vehicles, wherein the prognostic driving data comprises information about vehicles arranging to leave and/or arrive at parking spots of the parking area.

6. The method according to claim 1, wherein determining the recommended parking spot is performed when the vehicle is at a given arrival distance or arrival time from the programmed destination.

7. The method according to claim 1, wherein the recommended parking spot is determined by a calculation unit in wireless data communication with a communication unit of the vehicle.

8. The method according to claim 1, wherein the recommended parking spot is determined by a parking assistant of the vehicle.

9. The method according to claim 1, wherein determining the recommended parking spot takes into account prognostic driving data of the parked vehicles and further vehicles, wherein the prognostic driving data comprises information about vehicles arranging to leave and/or arrive at parking spots of the parking area.

10. The method according to claim 1, wherein the parking area is divided into subareas of different relevance levels, wherein the available parking spots are ranked according to a weight based on the relevance level of the subarea in which the respective available parking spot is located.

11. The method according to claim 1, wherein a sensor quality is assigned to the environment sensor system of each of the vehicle and the parked vehicle, wherein the available parking spots are ranked taking into account the sensor quality of the environment sensor system of the vehicle.

12. A parking assistant for adaptive parking of a vehicle, the parking assistant comprising:
   an environment sensor system configured to scan a traffic environment around the vehicle;
   a navigation system configured to determine a parking area around a programmed destination of the vehicle, the parking area having more than one available parking spot for the vehicle;
   a communication unit configured to acquire parking data of parked vehicles in the parking area via a wireless communication network, wherein the parking data for each parked vehicle comprises a parking position of the respective parked vehicle and an individual sensing coverage of an environment sensor system of the respective parked vehicle configured to scan the traffic environment within the parking area;
   a determination unit configured to calculate for each available parking spot in the parking area an overall sensing coverage for scanning the traffic environment within the parking area for the case of parking the vehicle in the respective available parking spot, based on an individual sensing coverage for scanning the traffic environment within the parking area from the respective parking spot with the environment sensor system of the vehicle and the individual sensing coverages of the parked vehicles, configured to rank the available parking spots based on a calculated overall sensing coverage, and configured to determine a recommended parking spot among the available parking spots based on overall sensing coverage of the traffic environment in the parking area; and
   an assisted/autonomous driving unit configured to steer the vehicle into the recommended parking spot.

13. The parking assistant according to claim 12, wherein the determination unit is configured to calculate the overall sensing coverage for different parking orientations in each available parking spot, and wherein the recommended parking spot includes a recommended parking orientation.

14. The parking assistant according to claim 12, wherein the determination unit is configured to determine the recommended parking spot taking into account prognostic driving data of the parked vehicles and further vehicles, wherein the prognostic driving data comprises information about vehicles arranging to leave and/or arrive at parking spots of the parking area.

15. The parking assistant according to claim 12, wherein the parking area is divided into subareas of different relevance levels, and wherein the available parking spots are ranked according to a weight based on the relevance level of the subarea in which the respective available parking spot is situated.

16. The parking assistant according to claim 12, wherein a sensor quality is assigned to the environment sensor system of each of the vehicle and the parked vehicles, wherein the available parking spots are ranked taking into account the sensor quality of the environment sensor system of the vehicle.

17. A vehicle comprising:
an environment sensor system configured to scan a traffic environment around the vehicle;
a navigation system configured to determine a parking area around a programmed destination of the vehicle, the parking area having more than one available parking spots for the vehicle;
a communication unit configured to acquire parking data of parked vehicles in the parking area via a wireless communication network, wherein the parking data for each parked vehicle comprises a parking position of the respective parked vehicle and an individual sensing coverage of an environment sensor system of the respective parked vehicle configured to scan the traffic environment within the parking area; and
a determination unit configured to calculate for each available parking spot in the parking area an overall sensing coverage for scanning the traffic environment within the parking area for the case of parking the vehicle in the respective available parking spot, based on an individual sensing coverage for scanning the traffic environment within the parking area from the respective parking spot with the environment sensor system of the vehicle and the individual sensing coverages of the parked vehicles, configured to rank the available parking spots based on a calculated overall sensing coverage, and configured to determine a recommended parking spot among the available parking spots based on overall sensing coverage of the traffic environment in the parking area; and
an assisted/autonomous driving unit configured to steer the vehicle into the recommended parking spot.

18. The vehicle according to claim 17, wherein the determination unit is configured to calculate the overall sensing coverage for different parking orientations in each available parking spot, and wherein the recommended parking spot includes a recommended parking orientation.

19. The vehicle according to claim 17, wherein the determination unit is configured to determine the recommended parking spot taking into account prognostic driving data of the parked vehicles and further vehicles, wherein the prognostic driving data comprises information about vehicles arranging to leave and/or arrive at parking spots of the parking area.

20. The vehicle according to claim 17, wherein the parking area is divided into subareas of different relevance levels, and wherein the available parking spots are ranked according to a weight based on the relevance level of the subarea in which the respective available parking spot is situated.

* * * * *